(12) United States Patent
Marseille

(10) Patent No.: US 9,817,794 B2
(45) Date of Patent: Nov. 14, 2017

(54) RESPONSIVE RENDERING OF DATA SETS

(71) Applicant: Tina Marseille, Heidelberg (DE)

(72) Inventor: Tina Marseille, Heidelberg (DE)

(73) Assignee: SAP SE, Walldorf (DE)

( * ) Notice: Subject to any disclaimer, the term of this patent is extended or adjusted under 35 U.S.C. 154(b) by 978 days.

(21) Appl. No.: 13/917,375

(22) Filed: Jun. 13, 2013

(65) Prior Publication Data

US 2014/0372874 A1    Dec. 18, 2014

(51) Int. Cl.
    G06F 17/00    (2006.01)
    G06F 17/21    (2006.01)
    G06F 17/24    (2006.01)

(52) U.S. Cl.
    CPC .......... G06F 17/212 (2013.01); G06F 17/243 (2013.01)

(58) Field of Classification Search
    CPC ....... G06F 17/21; G06F 17/212; G06F 17/243
    See application file for complete search history.

(56) References Cited

U.S. PATENT DOCUMENTS

| | | | |
|---|---|---|---|
| 5,068,809 A * | 11/1991 | Verhelst | G06T 11/60 715/201 |
| 5,796,401 A | 8/1998 | Winer | |
| 5,845,303 A | 12/1998 | Templeman | |
| 6,023,714 A | 2/2000 | Hill et al. | |
| 7,380,236 B2 | 5/2008 | Hawley | |
| 7,487,444 B2 | 2/2009 | Lira | |
| 7,581,176 B2 | 8/2009 | Wilson | |
| 8,381,096 B2 | 2/2013 | Yerubandi et al. | |
| 8,407,582 B2 | 3/2013 | Endo et al. | |
| 2003/0182628 A1* | 9/2003 | Lira | G06F 3/0485 715/252 |
| 2003/0222922 A1 | 12/2003 | Rummel | |
| 2004/0225967 A1* | 11/2004 | Hassanin | G06F 9/4448 715/760 |
| 2006/0259872 A1 | 11/2006 | Mullen et al. | |
| 2007/0097148 A1* | 5/2007 | Tanaka | G06T 11/60 345/619 |

(Continued)

OTHER PUBLICATIONS

Business Online, "8 Key Layout and Design Principles to Keep Your Users Engaged," 2 pp., document dated Jul. 27, 2010 (downloaded from the World Wide Web on May 7, 2013).

(Continued)

*Primary Examiner* — Marshon Robinson
(74) *Attorney, Agent, or Firm* — Klarquist Sparkman, LLP

(57) ABSTRACT

Approaches are presented for rendering the content of a data set in a grid that changes depending on screen size and/or orientation. For example, a tool such as a rendering engine distributes groups and sub-groups of a data set differently depending on screen width, which can help use available screen space efficiently. Or, the tool determines the layout of a data set on a grid so as to guide reading in a reading direction. By adjusting distances between groups and sub-groups, the layout can guide the user along the intended direction for reading. Or, the tool wraps long text blocks of a group into multiple text columns in order to distribute text evenly across the available space. Or, the tool adjusts the width of a page and/or the widths of groups depending on the width of text, which can help manage available space when content is translated between languages.

20 Claims, 14 Drawing Sheets

(56) References Cited

U.S. PATENT DOCUMENTS

| | | |
|---|---|---|
| 2007/0192686 A1 | 8/2007 | Fortes et al. |
| 2009/0319888 A1* | 12/2009 | Oygard ................ G06F 17/211 715/252 |
| 2012/0054602 A1 | 3/2012 | Demant et al. |
| 2012/0110480 A1 | 5/2012 | Kravets |
| 2013/0067430 A1 | 3/2013 | Mayer-Ullmann |

OTHER PUBLICATIONS

Pete Cashmore, "Why 2013 Is the Year of Responsive Web Design," 13 pp., document dated Dec. 11, 2012 (downloaded from the World Wide Web on May 7, 2013).

Ethan Marcotte, "Fluid Grids," CSS, HTML, Graphic Design, Layout & Grids, Responsive Design, 12 pp., document dated Mar. 3, 2009 (downloaded from the World Wide Web on May 7, 2013).

Ethan Marcotte, "Responsive Web Design," CSS, Layout & Grids, Mobile/Multidevice, Responsive Design, Interaction Design, 9 pp., document dated May 25, 2010 (downloaded from the World Wide Web on May 7, 2013).

Luke Wroblewski, "Multi-Device Layout Patterns," 9 pp., document dated Mar. 14, 2012 (downloaded from the World Wide Web on May 7, 2013).

\* cited by examiner software 280 implementing one or more
innovations for responsive rendering of data sets

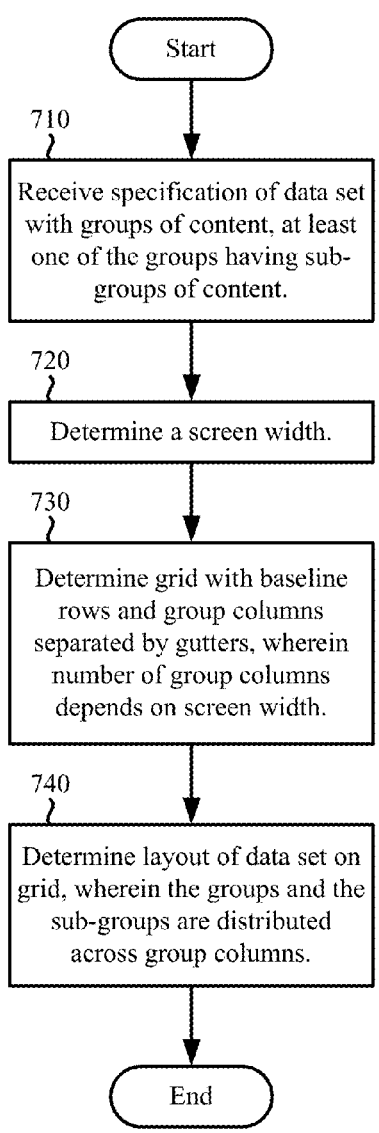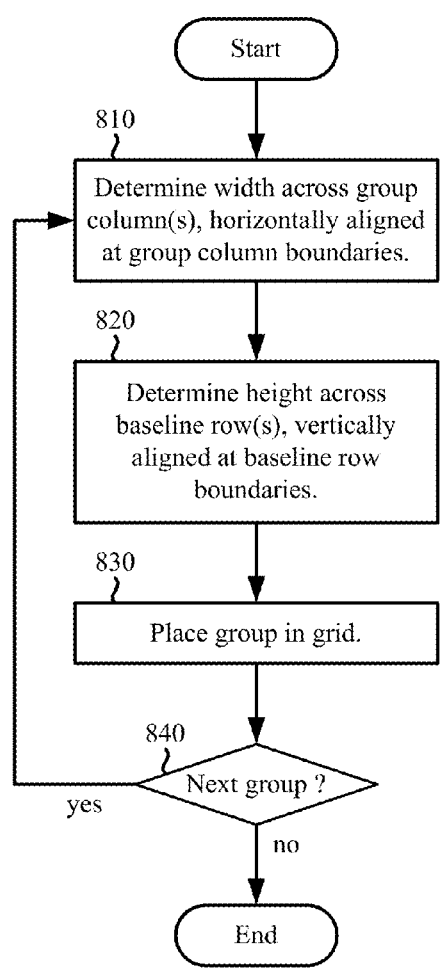

901

Grid with 3 strict group columns of uniform width

902

Grid with 3 flexible group columns of uniform width

903

Grid with 3 flexible group columns of different widths

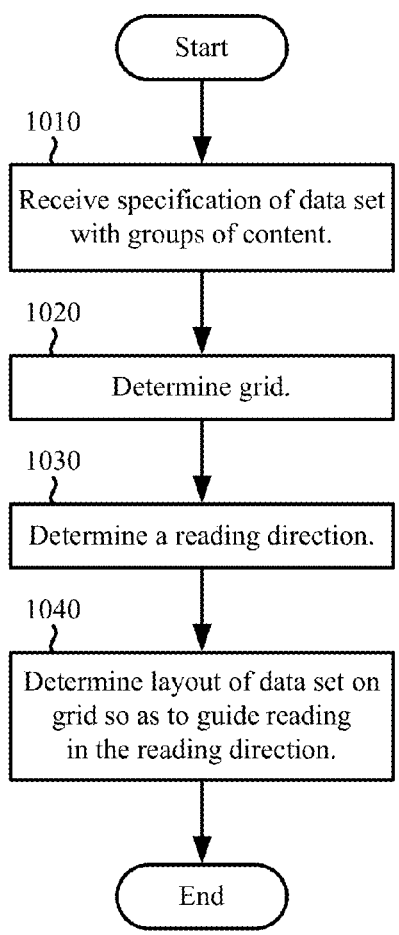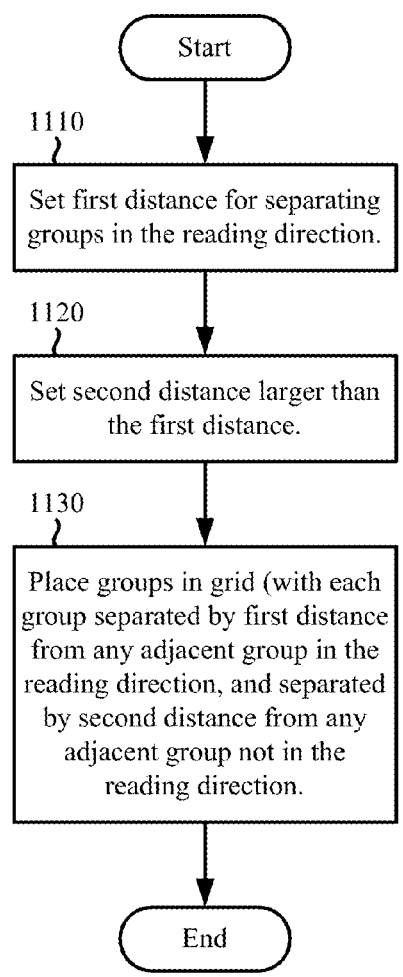

layout for mobile device

1301 layout for tablet

1302 layout for desktop

1303

RESPONSIVE RENDERING OF DATA SETS

FIELD

Rendering of content of a data set in a grid that changes depending on screen size and/or orientation.

BACKGROUND

Electronic forms are commonly rendered for display through a Web browser or application software. A typical form is a document that includes fields of information content. Sometimes, a user fills in blank fields of a form with information. In other cases, a user only views the information content of a form.

Different types of devices have screens that differ in terms of width and resolution. The content of a given form may be displayed on a smartphone with small screen, a tablet computer with a medium-size screen, or a desktop computer with a large screen. In addition, for some types of devices, the orientation of the device can change from time to time as a user rotates the device for viewing, which can change how the content of the form is rendered for display.

In common approaches to rendering of content as a form for display, the content of the form is arranged in a fixed number of columns. This allows the author to control the logical organization of presentation of the form content. For devices with large screens, however, rendering of content as a form in a fixed number of columns can leave too much empty, unused space that could otherwise be filled with content. On the other hand, for devices with small screens, rendering of content as a form in a fixed number of columns can result in a crowded display or result in some of the information content being pushed off screen (accessible by scrolling).

Some Web browsers adapt how Web content (such as HTML documents) is rendered depending on device characteristics. Typically, a primary flow of text content is wrapped from one side of the display to another, and images are scaled. These approaches do not work well for content rendered as a form. In particular, when content to be rendered as a form is hierarchically organized as groups and sub-groups, simply "wrapping" content from one side of the display to another can disrupt the logical flow of the content and result in inefficient use of available screen space.

SUMMARY

In summary, the detailed description presents innovations for rendering of data sets in devices with diverse screen sizes and orientations. These innovations can help preserve the logical organization of a data set regardless of the device on which the data set is rendered. In many of the examples described herein, the data set is rendered as a form with fields of text content organized as groups, which may include sub-groups. In other examples, the data set is rendered as a table or chart. The rendering of a data set can be combined with image output and/or associated with audio output.

According to a first aspect of the innovations described herein, a tool such as a rendering engine receives a specification of a data set that includes multiple groups of content. For example, the data set has hierarchically organized content, and at least one of the groups has multiple sub-groups of content.

The tool determines a grid for display configuration. For example, the grid has a number of baseline rows and a number of group columns separated by gutters. The number of group columns can depend on one or more of screen size and device orientation.

The tool also determines a reading direction (e.g., left-to-right, top-to-bottom) and determines a layout of the data set on the grid so as to guide reading in the reading direction. For example, the tool sets a first distance for separating groups in the reading direction and also sets a second distance larger than the first distance. The tool places the groups in the grid. Each of the groups is separated by the first distance from any adjacent group in the reading direction, and each of the groups is separated by the second distance from any adjacent group not in the reading direction. In this way, the layout guides the user along the intended direction for reading of the content of the data set.

When it determines the layout of the data set on the grid, the tool can also selectively split text into multiple text columns. For example, for a given group, the tool compares a count of text lines for the group to a threshold. If the count of text lines for the group satisfies the threshold, the tool places the text lines for the group in a single text column for the group. Otherwise, the tool splits the text lines for the given group into multiple text columns for the group, where the text lines for the group are split substantially evenly among the text columns for the group. In this way, the tool can wrap long text blocks in order to distribute text evenly across the available area of a screen, independently of scrolling/paging behavior.

According to a second aspect of the innovations described herein, a tool such as a rendering engine receives a specification of a data set having hierarchically organized content. The data set includes multiple groups of content, and at least one of the multiple groups has multiple sub-groups of content.

The tool determines a screen width (in pixels or other units) and also determines a grid for display configuration. The grid has a number of baseline rows and a number of group columns separated by gutters. In some implementations, each of the group columns includes one or more grid columns of the grid as well as any gutters between the one or more grid columns. The number of group columns depends at least in part on the determined screen width.

The tool determines a layout of the data set on the grid such that the groups and the sub-groups are distributed across group columns of the grid, depending on the screen width. In particular, the data set is structured as a form in the layout of the data set on the grid, where the form includes fields of text content in graphically distinct groups, which may include sub-groups. For example, according to the layout, each of the groups is to be placed across one or more of the group columns of the grid, aligned at group column boundaries, placed across one or more of the baseline rows of the grid, and aligned at baseline row boundaries.

According to a third aspect of the innovations described herein, a tool such as a rendering engine receives a specification of a data set that includes multiple groups of content. The tool determines a grid for display configuration. The tool also determines a layout of the data set on the grid. In doing so, the tool determines a width of text for one or more of the groups and determines a threshold for truncation based at least in part on the width of text. For example, the threshold for truncation can be a pre-determined proportion of a longest entry among the text for the groups. Or, the threshold for truncation can be a length of entry at a pre-determined percentile of length among the text for the groups. For a given group, the tool sets width of the group based at least in part on the width of text. Text of the group that is longer than the threshold is truncated.

In particular, adjusting the width of a page and/or the widths of groups depending on the width of text can help manage available space when content is translated between languages. A data set can be displayed with efficient use of available screen space in a language with relatively compact terms or in a language that uses more characters for the same content.

The foregoing and other objects, features, and advantages of the invention will become more apparent from the following detailed description, which proceeds with reference to the accompanying figures.

BRIEF DESCRIPTION OF THE DRAWINGS

FIGS. 7 and 8 are flowcharts showing a generalized technique for determining a layout of a hierarchically organized data set on a grid.

FIGS. 10 and 11 are flowcharts showing a generalized technique for determining a layout of a data set on a grid so as to guide reading in a reading direction.

DETAILED DESCRIPTION

The detailed description presents approaches to rendering of content of a data set in a grid that changes depending on screen size and/or orientation. In particular, the detailed description presents innovations for rendering of content of data sets in devices with diverse screen sizes and orientations. In many examples described herein, a data set is structured as a form for rendering, where the form includes fields of text content in graphically distinct groups, which may include sub-groups. This can simplify design of a form that will be correctly rendered on devices with different screen widths—maintaining the flow and organization of the information content of the form, while efficiently using available screen space.

The various aspects of the innovations described herein include the following.

1. Distributing groups and sub-groups of a data set differently depending on screen width. This can help efficiently use available screen space.
2. Determining the layout of a data set on a grid so as to guide reading in a reading direction. By adjusting distances between groups and sub-groups, the layout can guide the user along the intended direction for reading of the content.
3. Wrapping long text blocks of a group into multiple text columns in order to distribute text evenly across the available space of the screen, independently of scrolling/paging behavior.
4. Adjusting the width of a page and/or the widths of groups depending on the width of text, which can help manage available space a) when content is translated between languages and/or b) when content varies in width, e.g., a small form block next to a larger table on the same page or different pages.

Although operations described herein are in places described as being performed by a rendering engine, in many cases the operations can alternatively be performed by another type of tool. Some examples described herein involve data sets with content organized as groups and sub-groups. More generally, the innovations described herein can be applied for other types of data sets. In general, a data set can be any content that is unstructured in terms of explicit graphical layout until it is rendered for display in a given structure, which may be a form, table or chart. The rendering of a data set can be combined with image output and/or associated with audio output.

Various alternatives to the examples described herein are possible. For example, some of the methods described herein can be altered by changing the ordering of the method acts described, or by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Network Environments and Device Types.

Figure 1:
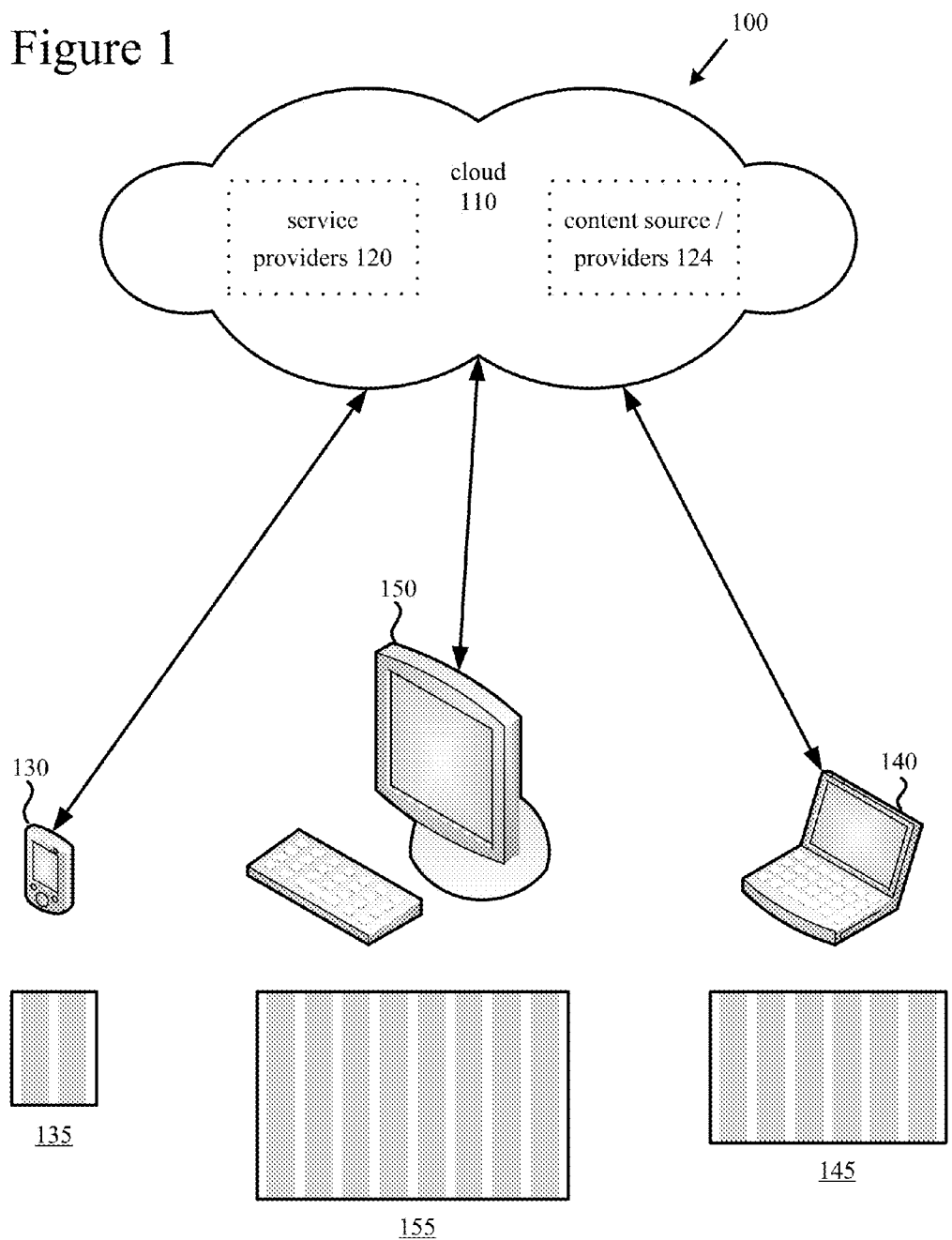
FIG. 1 is a diagram of an example network environment in which some described embodiments can be implemented.

FIG. 1 illustrates a generalized example of a suitable network environment (100) in which described embodiments, techniques, and technologies may be implemented.

In the example environment (100), various types of services (e.g., computing services) are provided by a cloud (110). For example, the cloud (110) is a collection of computing devices, which may be located centrally or distributed, that provide cloud-based services to various types of users and devices connected via a network such as the Internet. Some tasks (e.g., processing user input and presenting a user interface ("UI") can be performed on local computing devices (e.g., connected devices (130), (140), (150)) while other tasks (e.g., storage of data to be used in subsequent processing) can be performed in the cloud (110). Still other tasks (e.g., determining a layout of a data set on a grid) can be performed on a local computing device (e.g., connected device (130), (140) or (150)) or in the cloud (110).

In the example environment (100), the cloud (110) provides services for connected computing devices with a variety of screen capabilities. A connected device (130, 140 or 150) can include a Web browser, application software, operating system software or other software with a rendering engine that, given the specification of a data set and a display configuration parameterized as a grid, determines how to arrange the data set on the grid for rendering.

The connected device (130) represents a device with a narrow screen (135) (e.g., a small size screen). For example, the connected device (130) can be a mobile phone, smartphone, personal digital assistant, small tablet computer, or the like. Alternatively, the screen (135) can represent a larger tablet screen that is vertically oriented. Or, the screen (135) can represent a resized window on a larger screen. In FIG. 1, the screen (135) has two uniform columns in a grid. The columns are separated by a gutter.

The connected device (140) represents a device with a medium-size screen (145). For example, the connected device (140) could be a large tablet computer, laptop, notebook, netbook, or the like. Alternatively, the screen (145) can represent a resized window on a larger screen. In FIG. 1, the screen (145) has six uniform columns separated by gutters.

The connected device (150) represents a device with a large screen (155). For example, the connected device (150) can be a monitor for a desktop computer, a television screen or another device connected to a television (e.g., a set-top box or gaming console) or the like. In FIG. 1, the screen (155) has 8 uniform columns separated by gutters.

Devices without screen capabilities also can be used in the example environment (100). For example, the cloud (110) can provide services for one or more computers (e.g., server computers) without displays.

Services can be provided by the cloud (110) through service providers (120) or through other providers of online services (not depicted). For example, cloud services can be customized to the screen size, display capability, and/or touchscreen capability of a particular connected device (e.g., connected devices (130), (140), (150)). Content can be provided by the cloud (110) through one or more content source providers (124).

In the example environment (100), a service provider (120) or content source provider (124) can provide the specification of a data set to one or more of the connected devices (130, 140, 150), which process the data set for rendering. Or, a rendering engine of a service provider (120) or content source provider (124) can, given the specification of a data set and a display configuration (for a connected device) parameterized as a grid, determine how to arrange the data set on the grid for rendering, then provide the layout of the data set to the connected device. More generally, the service providers (120) can provide a centralized solution for various cloud-based services. The service providers (120) can manage service subscriptions for users and/or devices (e.g., for the connected devices (130), (140), (150) and/or their respective users).

Alternatively, described embodiments, techniques, and technologies may be implemented in a local computer environment, without networked computers. For example, a single computing system or device may perform functions of storing a data set, determining a layout of the data set on a grid, and processing user input to control a user interface).

II. Example Computing Systems.

Figure 2:
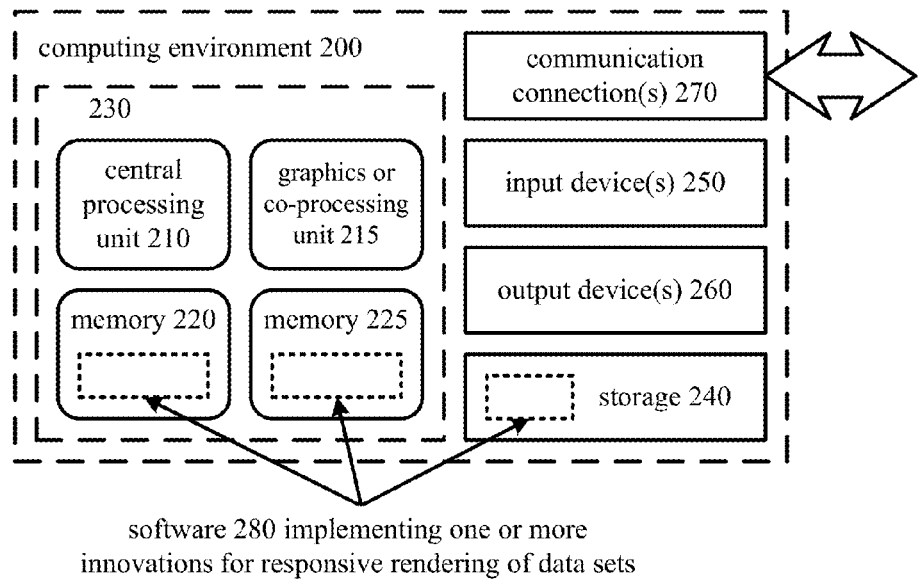
FIG. 2 is a diagram of an example computing system in which some described embodiments can be implemented.

FIG. 2 illustrates a generalized example of a suitable computing system (200) in which several of the described innovations may be implemented. The computing system (200) is not intended to suggest any limitation as to scope of use or functionality, as the innovations may be implemented in diverse general-purpose or special-purpose computing systems.

With reference to FIG. 2, the computing system (200) includes one or more processing units (210, 215) and memory (220, 225). The processing units (210, 215) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 2 shows a central processing unit (210) as well as a graphics processing unit or co-processing unit (215). The tangible memory (220, 225) may be volatile memory (e.g., registers, cache, RAM), non-volatile memory (e.g., ROM, EEPROM, flash memory, etc.), or some combination of the two, accessible by the processing unit(s). The memory (220, 225) stores software (280) implementing one or more innovations for responsive rendering of data sets, in the form of computer-executable instructions suitable for execution by the processing unit(s).

A computing system may have additional features. For example, the computing system (200) includes storage (240), one or more input devices (250), one or more output devices (260), and one or more communication connections (270). An interconnection mechanism (not shown) such as a bus, controller, or network interconnects the components of the computing system (200). Typically, operating system software (not shown) provides an operating environment for other software executing in the computing system (200), and coordinates activities of the components of the computing system (200).

The tangible storage (240) (also called computer-readable storage) may be removable or non-removable, and includes magnetic disks, magnetic tapes or cassettes, CD-ROMs, DVDs, or any other medium which can be used to store information and which can be accessed within the computing system (200). The storage (240) stores instructions for the software (280) implementing one or more innovations for responsive rendering of data sets.

The input device(s) (250) may be a touch input device such as a keyboard, mouse, pen, or trackball, a voice input device, touchscreen for receiving gesture input, a scanning device, or another device that provides input to the computing system (200). The output device(s) (260) may be a display (e.g., touchscreen), printer, speaker, CD-writer, or another device that provides output from the computing system (200).

The communication connection(s) (270) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (200), computer-readable media include memory (220, 225), storage (240), and combinations of any of the above.

The innovations can be described in the general context of computer-executable instructions (also called machine-readable instructions), such as those included in program modules (also called computer program product), being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit specially designed or configured to implement any of the disclosed methods (e.g., an ASIC such as an ASIC digital signal process unit, a graphics processing unit, or a programmable logic device such as a field programmable gate array).

For the sake of presentation, the detailed description uses terms like "determine," "provide" and "use" to describe computer operations in a computing system. These terms are high-level abstractions for operations performed by a computer, and should not be confused with acts performed by a human being. The actual computer operations corresponding to these terms vary depending on implementation.

III. Example Software Architecture.

Figure 3:
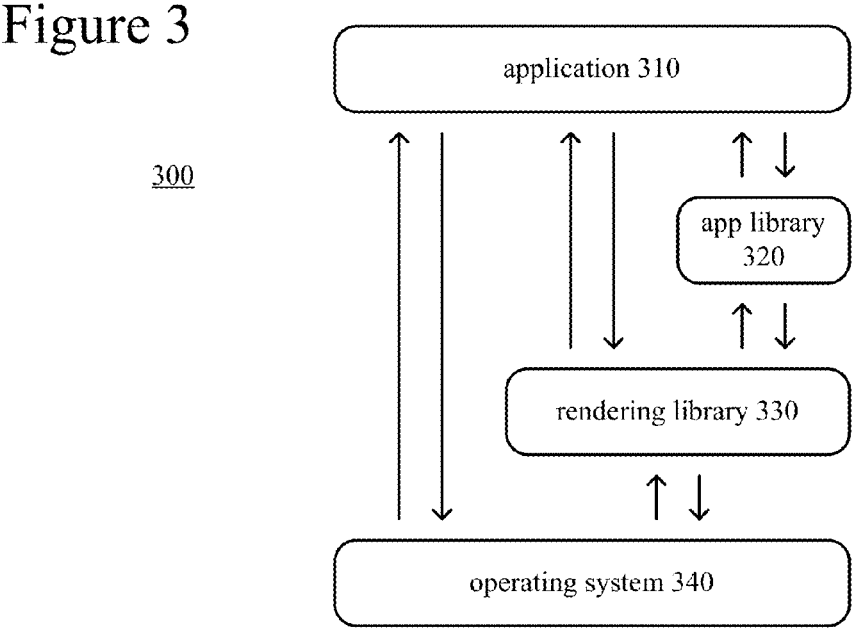
FIG. 3 is a diagram showing an example rendering architecture for responsive rendering of data sets.

FIG. 3 shows an example software architecture (300) that includes an application (310), application library (320), rendering library (330) and operating system (340). The software architecture (300) can be implemented on a smartphone, other mobile computing device or other computing device. Data sets described herein can be responsively rendered using software organized according to the software architecture (300).

The application (310) is software that provides functionality to a user. For example, the application (310) is a Web browser, a contact organizer, a database application or any other software that provides functionality to a user. In FIG. 3, the application (310) uses services provided by the application library (320), the rendering library (330) and the operating system (340).

The application library (320) implements functionality for the application (310) that is common to multiple applications. In this way, the multiple applications can reuse the same library (320). In FIG. 3, the application library (320) provides services to the application (310) and uses services provided by the rendering library (330). The application library (320) can also use services provided by the operating system (340).

The rendering library (330) provides services to the application (310) and application library (320), and the rendering library (330) uses services provided by the operating system (340). In example implementations, the rendering library (330) implements a rendering engine for determining layout of data sets on a grid. The rendering library (330) can implement a programming interface that is exposed to the application (310) and/or application library (320). The application (310) and/or application library (320) can call the programming interface to cause rendering of a data set.

The operating system (340) provides services to the application (310), application library (320) and rendering library (330). The operating system (340) can be an operating system adapted for a mobile computing device or other operating system. One or more modules in the operating system (340) convert user input from a touch screen, directional buttons on a keypad or keyboard, trackball, microphone or other input device into recognized UI events (e.g., a button click), gesture messages (e.g., in response to a panning or flick gesture by the user interacting with a touchscreen), navigation messages or other information that can be used in UI rendering. The operating system (340) can provide such events, messages, etc. to the application (310), application library (320) and rendering library (330). The events, messages, etc. generated in response to user input are translated into direct UI manipulation events for UI elements being rendered.

Within the rendering library (330) and/or operating system (340), one or more modules receive a markup language specification or other declarative description of a data set. For example, the specification of the data set is received from the application (310). Generally, a declarative description includes information that defines UI elements. The declarative description can be provided to markup generator, along with other information such as style information and/or configuration properties, and the markup generator generates markup language that can be used to render the UI elements. For layout, UI rendering requests are generated from the markup language description as well as direct UI manipulation events and other commands. For the rendering engine, the rendering library (330) include one or more modules for laying out UI elements for rendering. The operating system (340) includes one or more modules for receiving rendering requests and causing a rendered UI to be output for display.

Alternatively, the software architecture (300) includes more or fewer layers. For example, a given layer can be split into multiple layers, or different layers can be combined into a single layer. Functionality described with reference to one layer can in some cases be implemented in part or entirely in another layer. For example, the rendering engine can be implemented in part or entirely in the application (310), application library (320) or operating system (340). Or, the rendering engine can be implemented as part of a cloud-based computing device.

IV. Example Data Sets.

In general, a data set can be any content that is unstructured in terms of explicit graphical layout until it is rendered for display in a given structure, which may be a form, table or chart. When a data set is hierarchically organized as groups and sub-groups, the organization of the groups and sub-groups of a data set is defined by an author of the data set or template. The original author or an editor can add, remove or rearrange groups or sub-groups as desired. For example, a customer may be able to rearrange groups in order to customize a data set. An author, editor or end user can then provide details for the content of the respective groups and sub-groups. The content of the data set can provide a record for an employee database, sales database, finance database or other database.

Figure 4:
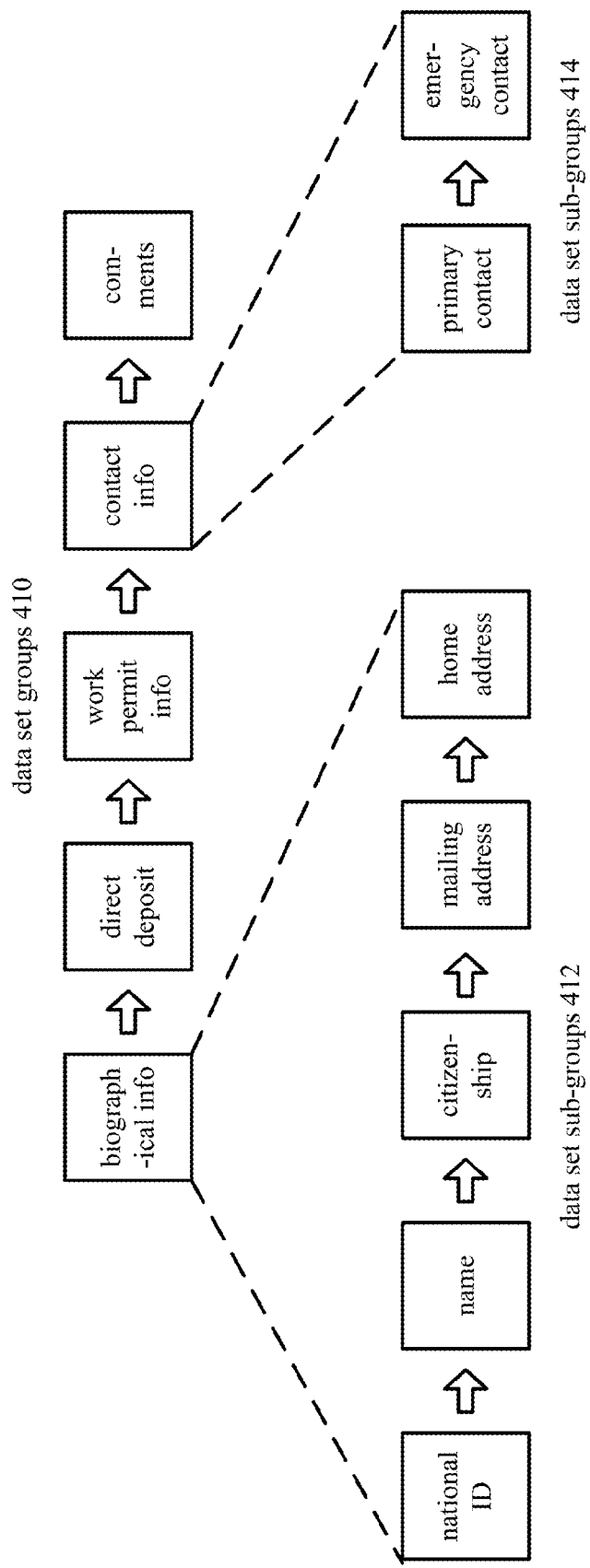
FIG. 4 is a diagram showing organization of an example data set with groups and sub-groups.

FIG. 4 shows organization of an example data set (400) with information about an employee. The data set (400) includes multiple groups (410) with details about biographical information, a direct deposit account, work permit information, contact information and general comments. The group (410) with details about biographical information includes five sub-groups (412), and the group (410) with details about contact information includes two sub-groups (414). Although not shown in FIG. 4, a given sub-group (412, 414) can itself include further sub-groups.

The data set can be hierarchically organized as groups and sub-groups, as shown in FIG. 4. The groups of a data set typically have a linear organization. Similarly, the sub-groups of a group typically have a linear organization. For example, the groups (410) in the data set (400) of FIG. 4 follow a linear flow, as do the sub-groups (412, 414) within their respective parent groups. The linear organization of the groups (or sub-groups) can reflect priorities of display. Or, the groups (or sub-groups) can be annotated with priority classifications that may be used in the rendering process.

Figure 5:
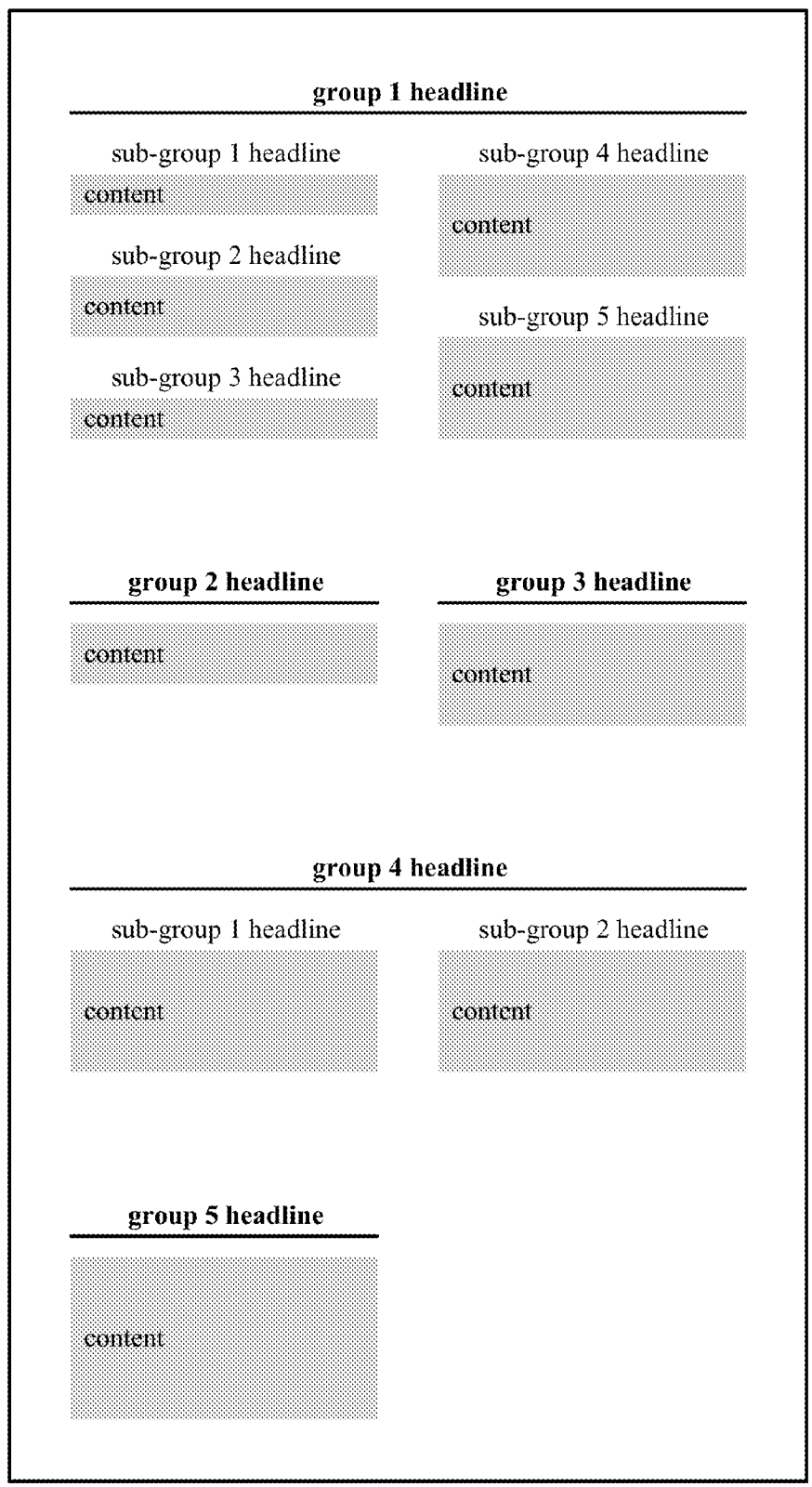
FIG. 5 is a diagram showing an example layout for a data set with groups and sub-groups.

FIG. 5 shows a page (500) in which the groups (410) and sub-groups (412, 414) of FIG. 4 are rendered. Two of the groups (group 1 and group 4) have sub-groups. A given group can have a group headline and content such as text information (e.g., labels and associated fields) or tables. A group can be split into one or more sub-groups, and each sub-group can have a sub-group headline and content. Groups (and sub-groups) can be separated by empty space, as shown in FIG. 5. Or, groups and sub-groups can have boxes and/or frames that visually separate them from other groups/sub-groups. The boxes around groups/sub-groups can have a different color than the page to further separate them visually. Boxes can include padding between outline and content, if there is empty space. Or, lines can be drawn to separate groups/sub-groups. Or, groups/sub-groups can be separated in some other way.

The number of levels possible for a hierarchy of groups and sub-groups depends on implementation. In some implementations, two levels (that is, groups and sub-groups) are used. In other implementations, a third level (that is, sub-groups of sub-groups) can be added. Additional levels (e.g., four or more) are possible but not likely needed in most use scenarios. Instead of rendering additional levels within a single screen, the UI can switch to another screen for details of further sub-groups.

As shown in FIG. 5, to indicate the width of a group, a line can be drawn under the group headline for the group and above its sub-groups (if any). The line runs the entire length of the group so as to emphasize which sub-groups are part of the group. Alternatively, no such lines are used under group headlines.

In addition to headlines and content for groups and sub-groups, the specification of a data set can include settings for font sizes and other aspects of UI elements, without specifying an explicit graphical layout. Some settings can be expressed as recommended aspect ratios that are independent of actual size values. For example, the widths and heights of groups and sub-groups can be specified as aspect ratios. Or, the widths and heights of groups and sub-groups can be specified in relative terms compared to the overall data set. Other settings control alignment of text for headlines and content. For example, in some implementations a headline is horizontally centered and vertically centered in the two baseline rows above content. Alternatively, a headline can be positioned anywhere across the x baseline rows above content. Typically, text of content is vertically aligned with baseline rows. Font size can be expressed in absolute terms or relative terms. Generally, the behavior of a sub-group inherits from the behavior of its parent group.

The specification of the data set can also include settings for features of a flexible grid in relative terms, without specifying an explicit graphical layout. In some implementations, the ratio between font size for text content and height of a baseline row for a grid is specified. For example, the ratio is 2:3 (which may result in, e.g., 12 point font and 18 point height for baseline rows). As another example, the ratio between font size and gutter width for a grid can be specified. Another ratio that can be specified is column width to gutter width. The specification for a data set can indicate a default number of group columns for groups of the data set, and can indicate different numbers of group columns for devices with different screen widths.

V. Example Grids and Layouts of Grids.

Figure 6:
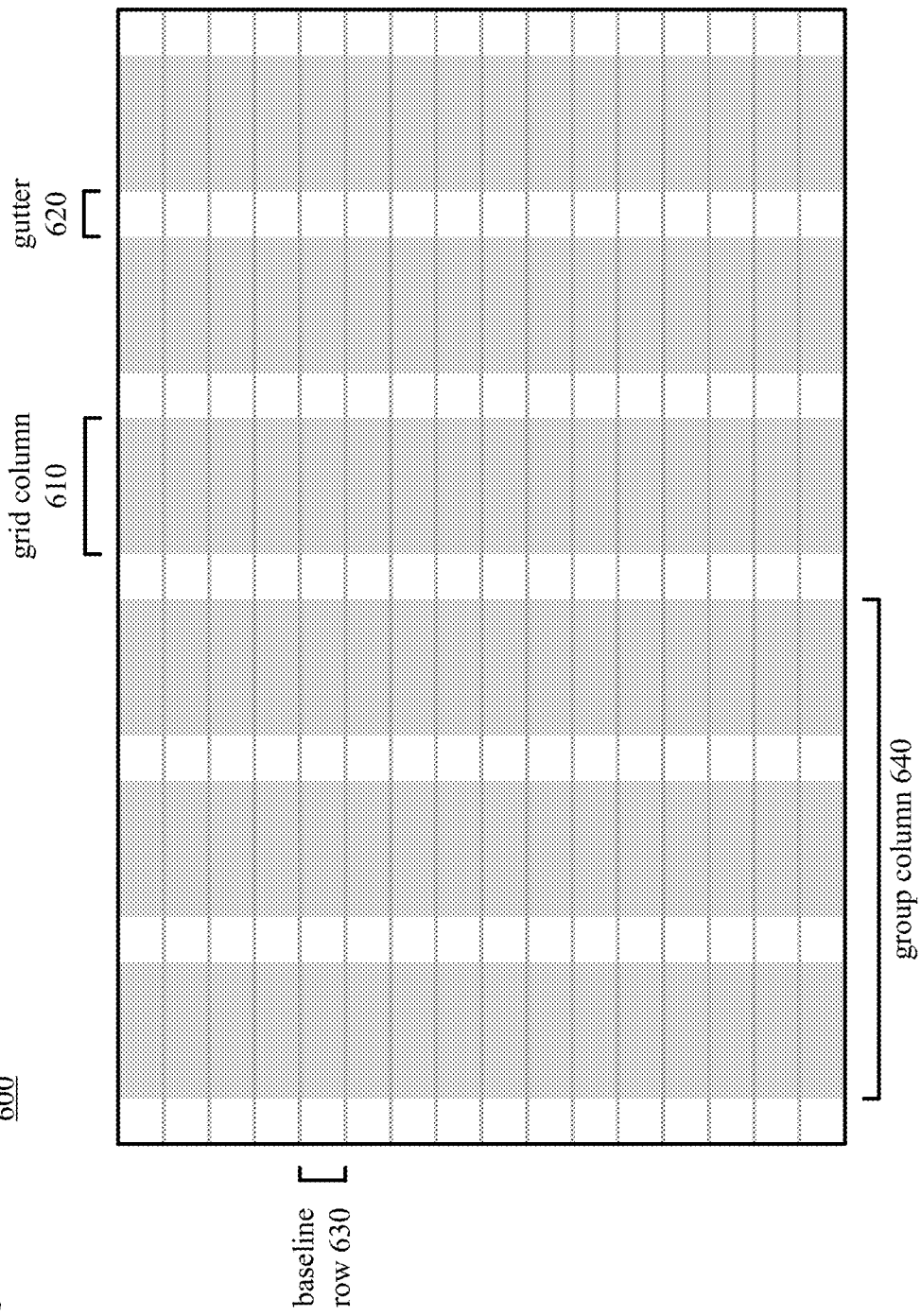
FIG. 6 is a diagram showing an example grid.

FIG. 6 shows an example grid (600). The grid (600) includes multiple grid columns (610) separated by gutters (620). The grid columns (610) have uniform width, as do the gutters (620) that separate grid columns (610). The grid (600) also includes multiple baseline rows (630) running horizontally across the grid (600). The baseline rows (630) have uniform height. A group column includes one or more of the grid columns (610) together with any gutters separating those grid columns. For example, the group column (640) includes three grid columns separated by two gutters. The group columns in a grid can have uniform width or non-uniform widths.

The grid can depend on the screen size (in pixels or other units) and/or orientation of a device. Or, more generally, the grid can depend on the screen width (in pixels or other units) of a device. In particular, the number of grid columns depends on the screen width of the device. Even for a given device, however, the number of grid columns and baselines can be adjusted. Thus, a designer can define different grids depending on use scenario for the same device.

FIG. 7 shows a technique (700) for determining a layout of a hierarchically organized data set on a grid. A tool such as a rendering engine performs the technique (700).

The tool receives (710) a specification of a data set having hierarchically organized content. The data set includes multiple groups of content, and at least one of the multiple groups has multiple sub-groups of content. In the specification, key attributes of the data set, such as widths and heights of groups and sub-groups, font sizes, etc., can be expressed as aspect ratios or otherwise expressed in relative terms. In addition, the content of the data set may be prioritized. In the specification of the data set, attributes of a grid, such as widths of columns and gutters, font size and height of baseline rows, can be expressed as aspect ratios or otherwise expressed in relative terms.

The tool determines (720) a screen width (in pixels or other units). For example, the tool identifies characteristics of the device using one or more media queries that can return screen width, screen height, aspect ratio, orientation and/or other information. The screen width can be a function of display size, window size and/or screen resolution.

The tool also determines (730) a grid for display configuration. The grid has a number of baseline rows and a number of group columns separated by gutters. In some implementations, each of the group columns includes one or more grid columns of the grid and any gutters between the grid column(s) in that group column. The number of group columns depends at least in part on the determined screen width. More generally, the tool can use the screen width and other actual device characteristics to determine the widths, heights, etc. for the grid based on relative terms for the columns, gutters and rows of the grid in the specification of the data set. In this way, the tool adapts the grid to the device and its orientation.

Finally, the tool determines (740) a layout of the data set on the grid. For example, the data set is structured as a form in the layout of the data set on the grid. In the layout, the groups and sub-groups of the data set can be distributed across group columns, with the content aligned for readability and ease of navigation, and with semantic organization of the data set maintained where possible. Given the actual characteristics of the device, the widths, heights, font sizes, etc. for elements of the data set are set according to the relative terms of the specification of the data set. Alternatively, the data set can be rendered as a table or chart. The rendering of the data set can be combined with image output and/or associated with audio output.

FIG. 8 shows one approach (800) to determining the layout of the data set on the grid. The tool determines how to place each of the groups of the data set on the grid. For a given group, the tool determines (810) the width of the group across one or more group columns, with the group aligned at group column boundaries. The tool also determines (820) the height of the group across one or more baseline rows, with the group aligned at baseline row boundaries. The tool then places (830) the group in the grid and continues (840) with the next group, if any. Thus, each of the groups is to be placed across one or more of the group columns of the grid, aligned at group column boundaries, placed across one or more of the baseline rows of the grid, and aligned at baseline row boundaries.

Alternatively, the tool uses another approach to determining the layout of the data set on the grid. Or, for special types of data sets or use scenarios, the tool does not use a grid when determining how to render the data set.

As a general rule, the tool places groups (or sub-groups within a group) to align at baseline row boundaries. By default, when placed next to each other from left to right, groups (sub-groups) of the same height are top aligned and bottom aligned (see groups A and C in FIGS. 9a-9c); if groups (sub-groups) are not the same height, top alignment is favored (see groups A, B and C in FIGS. 9a-9c). Small differences in alignment are avoided, where possible, since small differences in alignment can be distracting. Bottom alignment can be favored over top alignment in special cases (e.g., for pictures or charts), but groups (sub-groups) with mostly text content (e.g., for forms, tables) are top aligned by default. When groups (or sub-groups) are aligned, label fields of a group (sub-group) can be aligned with label fields of other groups (sub-groups).

As another general rule, the tool places groups (or sub-groups within a group) to align at the group column boundaries. By default, when placed next to each other from top to bottom, groups (sub-groups) of the same width are left aligned and right aligned; if groups (sub-groups) are not the same width, they are either left aligned or right aligned, where possible.

A given group can have a default width that varies depending on the screen width (e.g., one group column for first range of screen widths, two group columns for second range of screen widths, etc.). When the number of group columns set for a group is flexible, the default width can be extended if there is available screen space and sufficient content in the group to fill the available screen space.

Figure 9A:
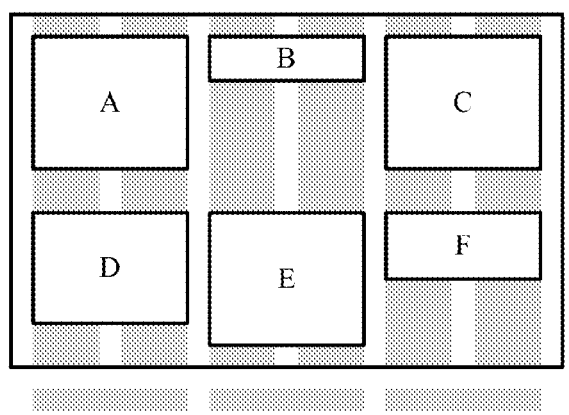
FIG. 9*a*-9*c* are diagrams showing example layouts of data sets on grids with different numbers of group columns.

FIG. 9a shows an example layout (901) in which the grid has three strict group columns of uniform width. Each of the group columns includes two grid columns and the gutter separating those two grid columns. Each group is placed in one and exactly one group column. Groups are horizontally aligned at group column boundaries, and they are vertically aligned at baseline row boundaries (with top alignment favored).

Figure 9B:
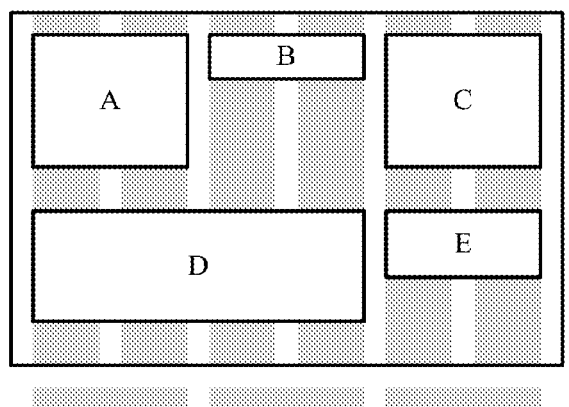

FIG. 9b shows an example layout (902) in which the grid has three flexible group columns of uniform width. Again, each of the group columns includes two grid columns and the gutter separating those two grid columns. A group can be placed in a single group column (like groups A, B, C and E). Or, a group can be placed in multiple group columns (like group D). Thus, depending on its content, a group can have the width of a single group column or the group can stretch to the next group column. The groups are aligned at group column boundaries, and they are aligned at baseline row boundaries (with top alignment favored).

Figure 9C:
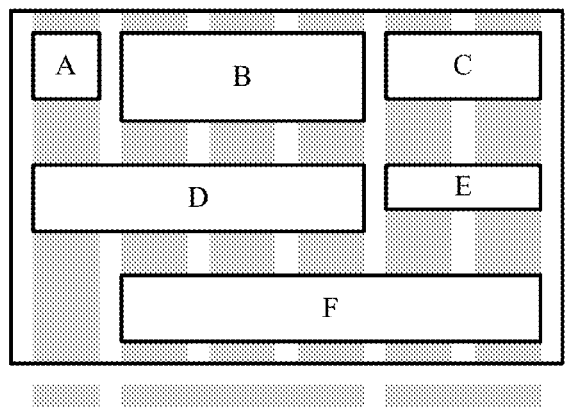

FIG. 9c shows an example layout (903) in which the grid has three flexible group columns of non-uniform widths. The first group column has a width of one grid column. The second group column has a width of three grid columns, and the third group column has a width of two grid columns. A group can be placed in a single group column or multiple group columns, depending on its content. The groups are aligned at group column boundaries, and they are aligned at baseline row boundaries (with top alignment favored).

When a group has multiple sub-groups, the width (in group columns) of the group can depend at least in part on the number of sub-groups within the group, such that the sub-groups are distributed throughout the group columns for the group. For example, if x group columns are available, the group can be extended across up to x group columns, depending on the number of sub-groups. If the group is placed across a single group column of the grid, the multiple sub-groups can be placed vertically within the group column. If the group is placed across multiple group columns of the grid, for each of the group columns in succession, the multiple sub-groups can be placed vertically within the group column up to the height of the group.

VI. Guidance in Reading Direction.

FIG. 10 shows a technique (1000) for determining a layout of a data set on a grid so as to guide reading in a reading direction. A tool such as a rendering engine performs the technique (1000).

The tool receives (1010) a specification of a data set that includes multiple groups of content. For example, the data set and specification can be organized as described in sections IV and V. The tool determines (1020) a grid for display configuration. For example, the grid can be determined as described in section V.

The tool also determines (1030) a reading direction. For example, the reading direction can be left-to-right, with successive rows arranged top-to-bottom. Or, the reading direction can be top-to-bottom, with successive columns arranged left-to-right. The default reading direction typically depends on language used. For example, the default reading direction is left-to-right for languages that run left-to-right. For other languages, the default reading direction can change accordingly.

Finally, the tool determines (1040) a layout of the data set on the grid so as to guide reading in the reading direction. In this way, content of the data set is aligned for readability and ease of navigation, with semantic organization of the data set maintained where possible.

FIG. 11 shows one approach (1100) to determining the layout of the data set on the grid so as to guide reading direction. The tool sets (1110) a first distance for separating groups in the reading direction. The tool also sets (1120) a second distance larger than the first distance. For example, when the reading direction is left-to-right, the first distance is the width of a gutter of the grid, and the second distance is an integer number of baseline rows that results in a distance longer than the width of the gutter. Alternatively, the first and second distances have other values. The tool then places (1130) the groups in the grid. Each of the groups is separated by the first distance from any adjacent group in the reading direction, and each of the groups is separated by the second distance from any adjacent group not in the reading direction. Alternatively, the tool uses another approach to determining the layout of the data set on the grid so as to guide reading direction.

Figure 12A:
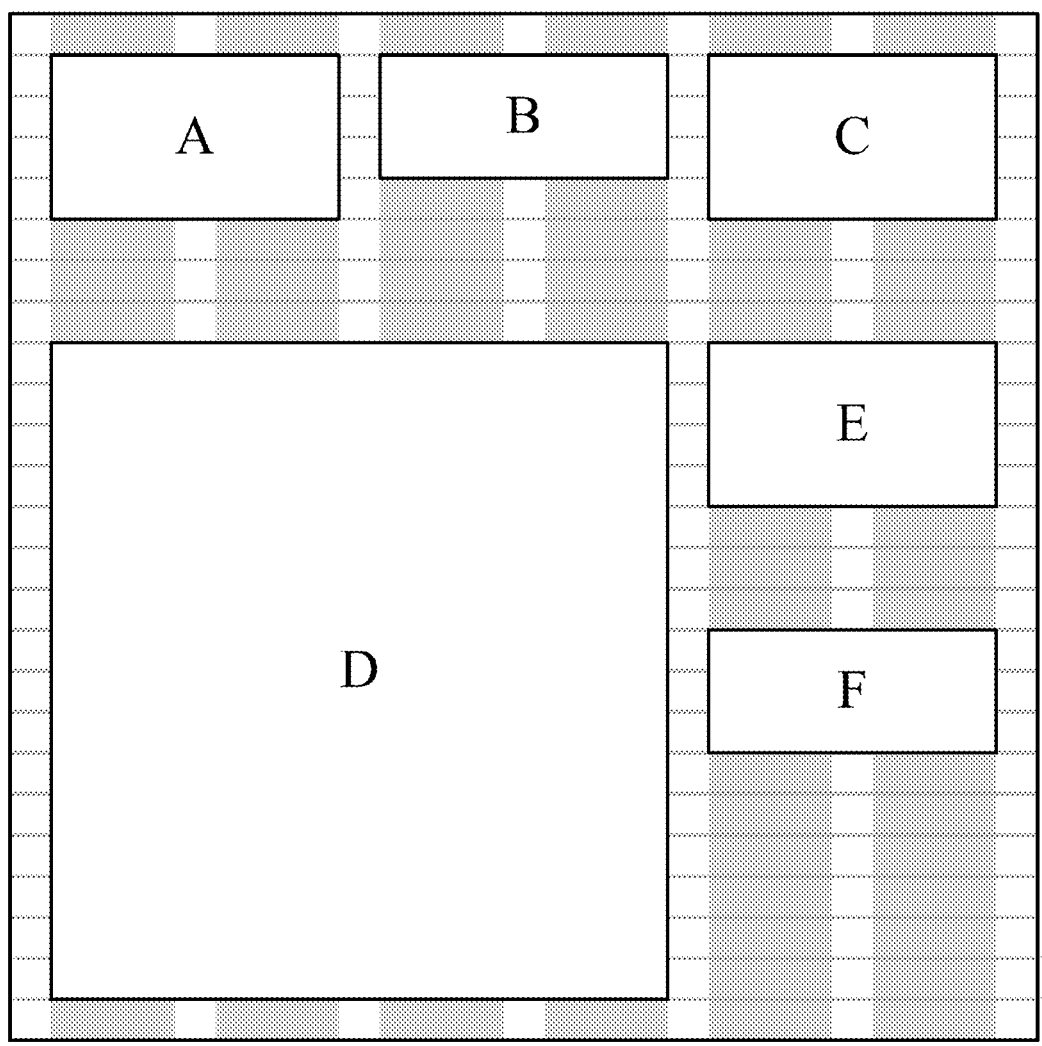
FIGS. 12*a* and 12*b* are diagrams showing example layouts of a data set on a grid with guidance in a reading direction.

FIG. 12a shows an example layout (1201) of a data set on a grid with guidance in a reading direction. The distance between groups in the reading direction (e.g., A→B→C) is smaller than the distance between groups not in the reading direction (e.g., A versus D). The smaller distance emphasizes the desired flow between groups. In FIG. 12a, the distance between adjacent groups in the reading direction is the gutter width, and the distance between adjacent groups not in the reading direction is three baseline rows. Small groups (e.g., E and F) fill up space next to a larger group.

When a group has a large amount of text, the text of the group can be split into multiple text columns. Groups with more than x lines split text after x lines (x depends on implementation and is, for example, 15 lines). The text splits into multiple columns, into which text is evenly distributed. According to one approach, when the tool determines the layout of the data set, for a given group, the tool compares a count of text lines for the group to a threshold (e.g., 15 lines). If the count of text lines for the group satisfies the threshold (e.g., is less than the threshold, or is less than or equal to the threshold), the tool places the text lines for the group in a single text column for the group. Otherwise, the tool splits the text lines for the group into multiple text columns for the group, where the text lines for the group are split substantially evenly among the multiple text columns for the group, independently of scrolling/paging behavior. In addition, the count of text lines can control whether the text is split into two, three or more text columns.

Figure 12B:
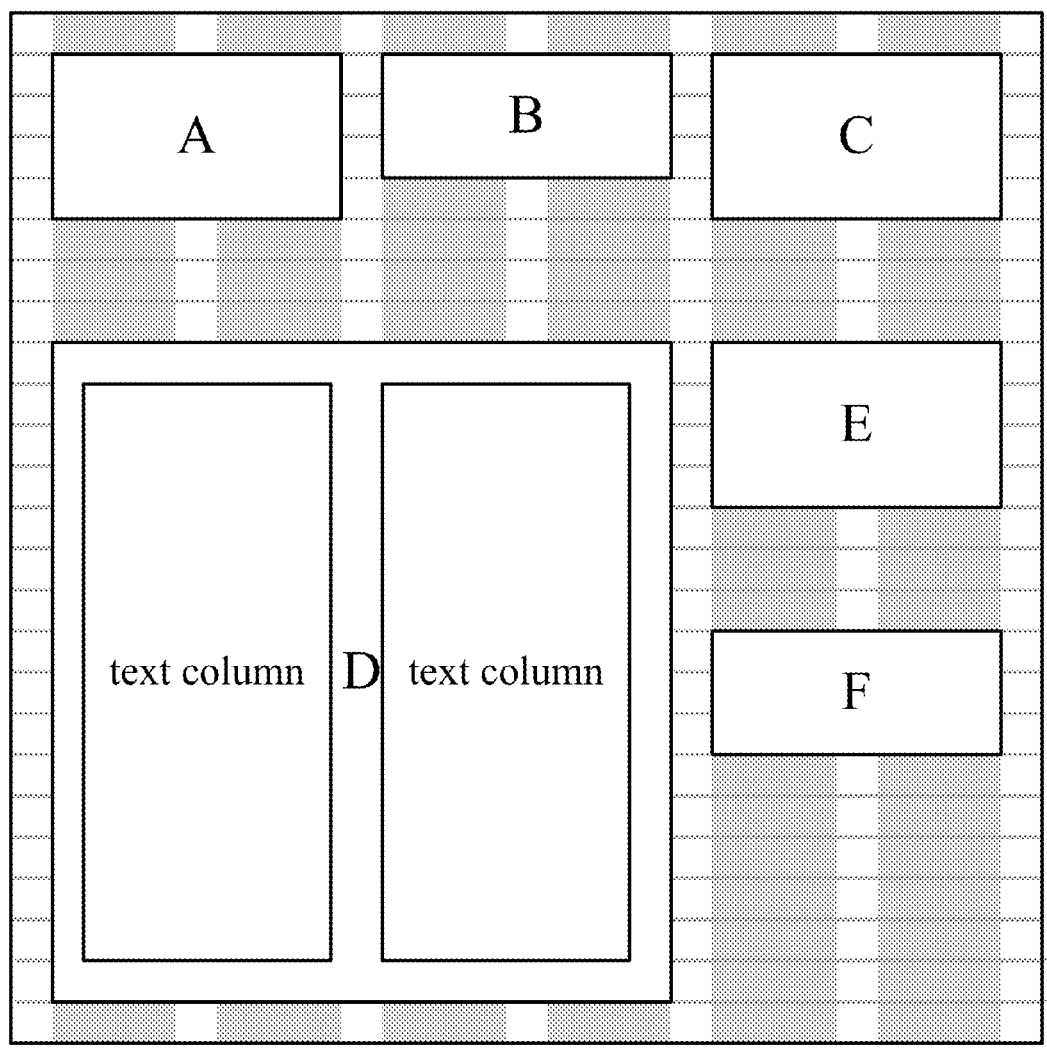

FIG. 12b shows an example layout (1201) of a data set on a grid with guidance in a reading direction, where text for a large group is split into multiple text columns. In particular, the text lines of group D are split into two text columns.

The reading direction for sub-groups of a group can be the same as the reading direction for groups. Or, the reading direction for sub-groups can be different than (e.g., orthogonal to) the reading direction for groups.

Figure 13A:
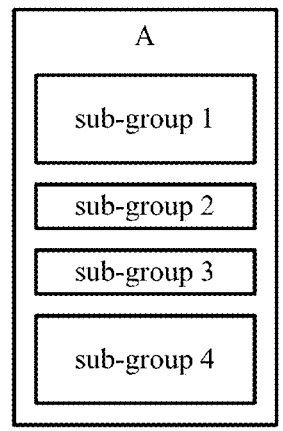
FIGS. 13*a*-13*c* are diagrams showing example layouts of a data set with guidance in a reading direction, for devices with different screen widths.
Figure 13B:
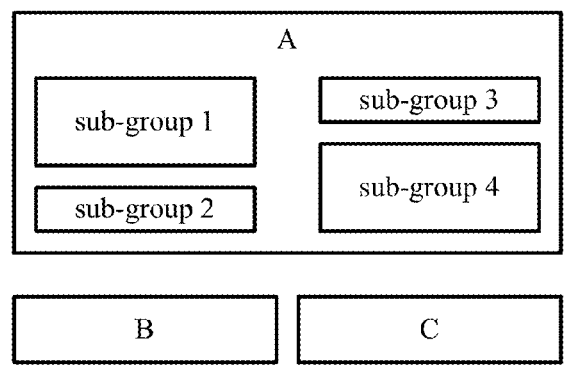
Figure 13C:
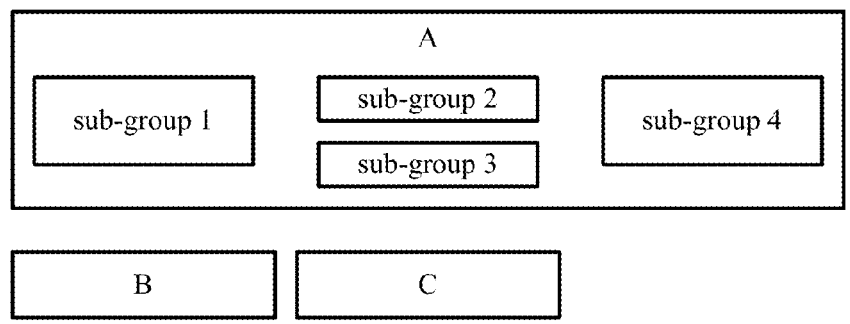

FIGS. 13a-13c show example layouts (1301, 1302, 1303) for a data set with guidance in a reading direction, for devices with different screen widths (or for different window sizes when a window is resized, or for different screen resolutions when resolution is adjusted on a given device). In FIGS. 13a-13c, the reading direction for groups is left-to-right, but, within a group, the reading direction for sub-groups is top-to-bottom.

FIG. 13a shows an example layout (1301) for a mobile device with a screen having a small screen width (or for a narrow window after resizing, or for a low screen resolution after adjustment). Groups are arranged in a single group column, separated by a larger distance. Sub-groups within group A are separated vertically by a smaller distance.

FIG. 13b shows an example layout (1302) for a tablet with a screen having a larger screen width (or for a medium-width window after resizing, or for a medium screen resolution after adjustment). Groups are arranged in two group columns, separated horizontally (where applicable) by a smaller distance and separated vertically by a larger distance. Sub-groups within group A are separated vertically by the smaller distance and separated horizontally by the larger distance.

FIG. 13c shows an example layout (1303) for a desktop computer with an even larger screen width (or for a wide window after resizing, or for a high screen resolution after adjustment). Groups are arranged in three group columns, separated horizontally (where applicable) by a smaller distance and separated vertically by a larger distance. Sub-groups within group A are separated vertically by the smaller distance and separated horizontally by the larger distance.

VII. Other Layout Rules.

Other layout rules change the widths of groups or sub-groups depending on the width of text for the groups or sub-groups. The width of text for a data set can change for different languages. Some languages are relatively compact, while other languages require more space for the same content. By adjusting the widths of groups and sub-groups to text width, available screen space can be more efficiently used.

Figure 14:
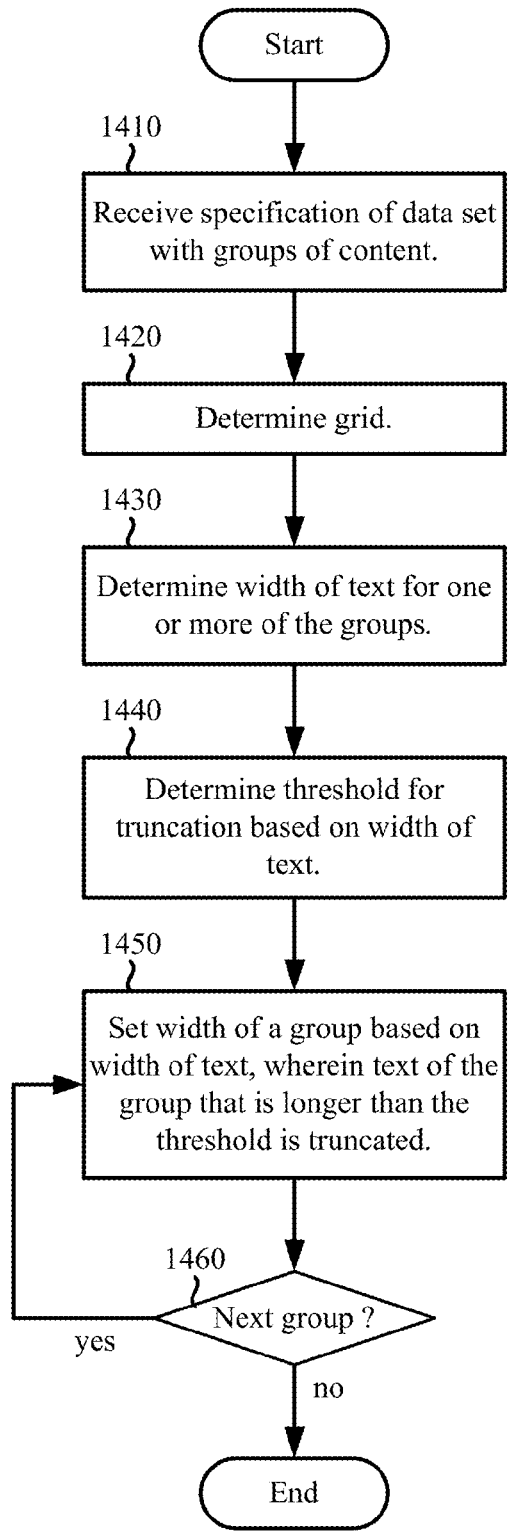
FIG. 14 is a flowchart showing a generalized technique for determining widths of groups of content of a data set.

FIG. 14 shows a technique (1400) for determining widths of groups of content of a data set. A tool such as a rendering engine performs the technique (1400).

The tool receives (1410) a specification of a data set that includes multiple groups of content. For example, the data set and specification can be organized as described in sections IV and V. The tool determines (1420) a grid for display configuration. For example, the grid can be determined as described in section V.

The tool then determines a layout of the data set on the grid. Specifically, the tool determines (1430) a width of text for one or more of the groups and determines (1440) a threshold for truncation based at least in part on the width of text. For example, the threshold for truncation can be a pre-determined proportion (such as 80%) of a longest entry among the text for the groups. Or, the threshold for truncation can be a length of entry at a pre-determined percentile (such as 80%) of length among the text for the groups. Thus, the width of a page (and hence maximum width for a given group) can be set based on the width of text entries of the groups evaluated, as truncated. For fields of text, this width depends on the entry. Some fields (e.g., dates in MMDDYY format) have a fixed length, while other fields (e.g., email addresses) can have different lengths.

Then, for each of the one or more groups evaluated, the tool sets (1450) the width of the group based at least in part on the width of text. If the text includes labels and fields, the width of the group can also be based at least in part on a default ratio of label width to field width. In example implementations, the ratio of label width to field width is 2:3. Text of the group that is longer than the threshold is truncated. The tool continues (1460) with the next group. The width of a given group can also be adjusted depending on text entries for that group. If there is a difference between the text width of a given group and the text width of other groups, the system can place the text for the given group across less or more group columns.

For example, the tool can measure the lengths of the text fields of a group of a data set, given a font size. The tool can then set a threshold for truncation at x % of the length of the longest text field, yielding a field width. The label width is then set based on the default ratio of label width to field width. If the lengths of the text fields are 100, 120, 150, 80, 60 and 100, and the threshold for truncation is 80%, the field width after truncation is 0.8×150=120 (any text field longer than 120 is truncated). If the label-to-field ratio is 2:3, the label width is 80. If that is not enough room for the labels, the label width can be expanded. Also, the overall width of labels and fields can be adjusted to fit within an integer number of group columns, with the ratio of label width to field width maintained.

Figure 15:
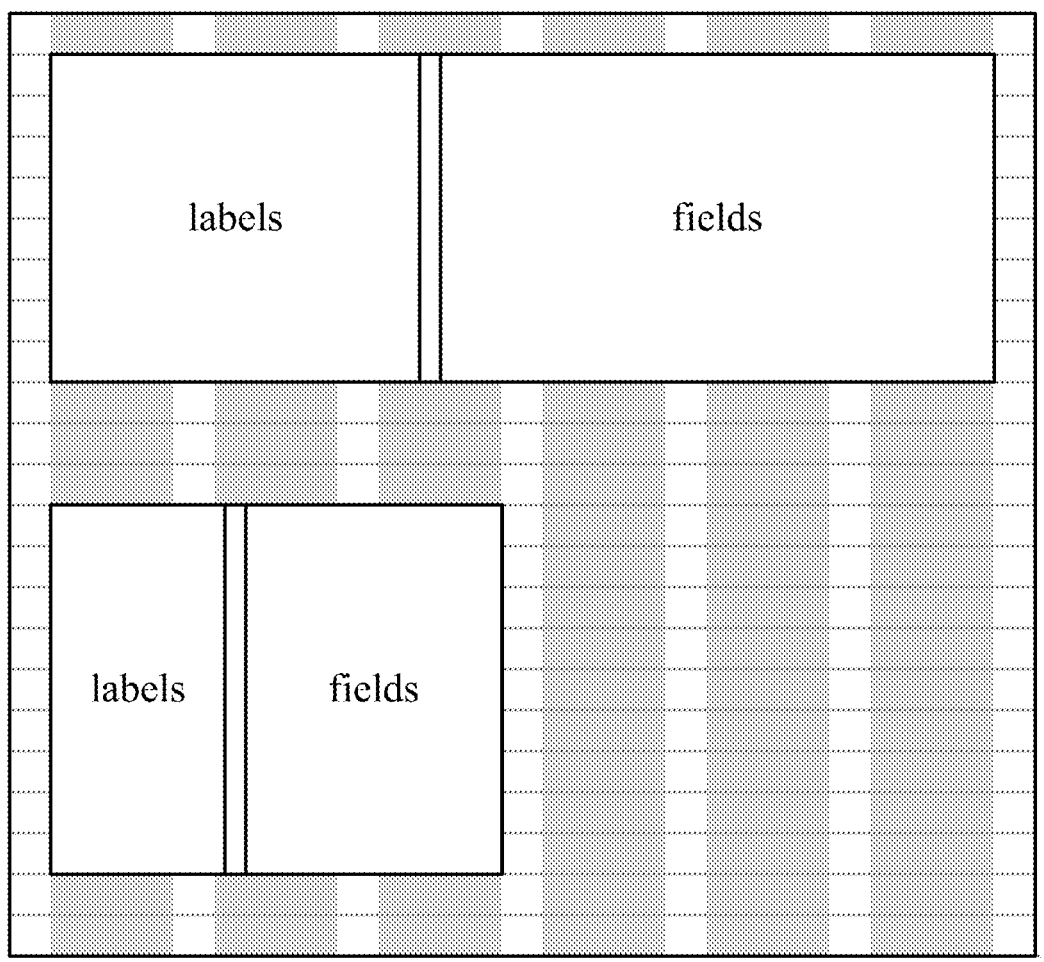
FIG. 15 is a diagram showing labels and fields of groups having different widths.

FIG. 15 shows labels and fields of two groups having different widths. The ratio of label width to field width is the same for both groups. Thus, the widths of groups with labels and fields can adapt to widths of the text within the respective groups.

Figure 16A:
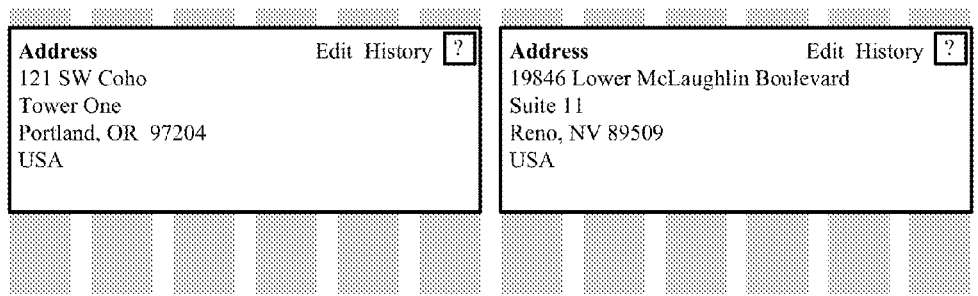
FIG. 16*a* is a diagram showing blocks of content for groups having widths set without removal of empty space.

Another potential problem arises when groups of related content are rendered with too much empty space. FIG. 16a shows blocks of content for groups having widths set without removal of empty space. This can cause loss of context and uneven presentation.

Figure 16B:
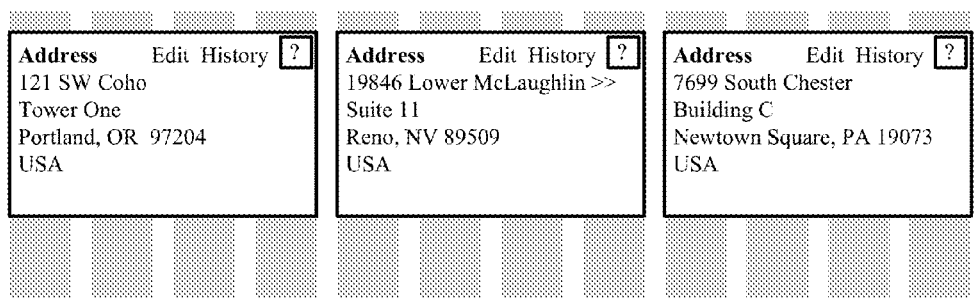
FIG. 16*b* is a diagram showing blocks of content for groups having widths set depending on text length.

To address this problem, when the layout of a data set on a grid is determined, the tool can determine a width of text for multiple related groups of the data set. The width of the text for the multiple related groups can be truncated at a threshold (e.g., 80% of longest entry). Then, for each of the groups taken individually, the tool can set the width of the group based at least in part on the width of text for the multiple groups. When the groups are rendered, text is spread out across the screen more evenly, with less empty space. When truncation has been used, text longer than the threshold amount is truncated. This approach can be applied for groups next to each other and for information within such groups. FIG. 16b shows blocks of content for groups having widths set depending on text length for the related groups. For the middle group, text for the longest entry is truncated.

Although the preceding examples in this section address determination of widths of groups, the approaches can also be applied for sub-groups. These approaches can help address space management problems when content is translated. A language with relatively short text can be displayed with smaller groups, hence using screen space efficiently, while a language with more characters for the same content can also be displayed with wider groups, while still using screen space efficiently.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

I claim:

1. In a computing system that implements a rendering engine, a method comprising:
    receiving, at the computing system, a specification of a data set that includes multiple groups of content;
    with the computing system, determining a grid for display configuration;
    with the computing system, determining first and second reading directions;
    with the computing system, automatically determining a first layout position on the grid for a first group of content of the multiple groups of content;
    with the computer system, automatically placing the first group of content on the grid at the determined first layout position;
    with the computer system, prior to placing a second group of content of the multiple groups of content on the grid, automatically determining a second layout position for the second group of content, the second layout position located on the grid at a position in the first reading direction relative to the first layout position;
    with the computer system, automatically placing the second group of content on the grid at the determined second layout position;
    with the computer system, prior to placing a third group of content of the multiple groups of content on the grid, automatically determining a third layout position for the third group of content, the third layout position located on the grid at a position in the second reading direction relative to the first layout position;
    with the computer system, automatically placing the third group of content on the grid at the determined third layout position; and
    with the computing system, displaying the data set according to the first, second, and third layout positions.

2. The method of claim 1, further comprising:
    setting a first distance for separating groups in the first reading direction;
    setting a second distance larger than the first distance; and
    placing the multiple groups in the grid, wherein each of the multiple groups is separated by the first distance from any adjacent group in the first reading direction, and wherein each of the multiple groups is separated by the second distance from any adjacent group not in the first reading direction.

3. The method of claim 2 wherein the first distance is a gutter width and the second distance is an integer number of baseline rows.

4. The method of claim 1 wherein the grid comprises a number of baseline rows and a number of group columns separated by gutters, and wherein each of the multiple groups is:
    placed across one or more of the group columns of the grid;
    aligned at group column boundaries;
    placed across one or more of the baseline rows of the grid; and
    aligned at baseline row boundaries.

5. The method of claim 4 wherein the number of group columns depends on one or more of screen size and device orientation.

6. The method of claim 1, wherein the data set has hierarchically organized groups of content, at least one of the multiple groups of content having multiple sub-groups of content, and wherein a first reading direction for the groups of content is a first direction and a first reading direction for the sub-groups of content is a second direction, the second direction being different than the first direction, the multiple sub-groups of content to be placed within a layout area identified for the at least one of the multiple groups of content.

7. The method of claim 6, further comprising:
    setting a first distance for separating groups of content or sub-groups of content in their respective first reading direction;
    setting a second distance larger than the first distance; and
    placing the multiple groups of content and sub-groups of content on the grid, wherein each of the multiple groups of content and sub-groups of content is separated by the first distance from any adjacent group of content or sub-group of content in the first reading direction, and wherein each of the multiple groups of content or sub-groups of content is separated by the second distance from any adjacent group of content or sub-group of content not in the first reading direction.

8. The method of claim 1, wherein the data set has hierarchically organized groups of content, at least one of the multiple groups of content has multiple sub-groups of content, and wherein a first reading direction for the groups of content is left-to-right and a first reading direction for the sub-groups of content is top-to-bottom, the multiple sub-groups of content to be displayed within a layout area for the at least one of the multiple groups of content.

9. The method of claim 8, further comprising:
setting a first distance for separating groups of content or su-groups of content in their respective first reading direction;
setting a second distance larger than the first distance; and
placing the multiple groups of content and sub-groups of content on the grid, wherein each of the multiple groups of content and sub-groups of content is separated by the first distance from any adjacent group of content or sub-group of content in the first reading direction, and wherein each of the multiple groups of content or sub-groups of content is separated by the second distance from any adjacent group of content or sub-group of content not in the reading direction.

10. The method of claim 1, further comprising determining the first and second reading directions from a language in which text associated with the data set is written.

11. A computing system adapted to perform a method comprising:
receiving a specification of a data set that comprises multiple groups of content;
determining a grid for display configuration;
receiving a specification of first and second reading directions;
setting a first distance for separating groups of content in the first reading direction;
setting a second distance larger than the first distance;
automatically determining a first layout position on the grid for a first group of content of the multiple groups of content;
prior to placing a second group of content of the multiple content groups on the grid, automatically determining a second layout position for the second group of content, the second layout position located on the grid at a first position in the reading direction relative to, and at the first distance from, the first layout position;
automatically placing the second group of content on the grid at the determined second layout position;
prior to placing a third group of content of the multiple content groups on the grid, automatically determining a third layout position for the third group of content, the third layout position located on the grid at a position relative to, and at the second distance from, the first layout position;
automatically placing the third group of content on the grid at the determined third layout position; and
displaying the data set according to the first, second, and third layout positions.

12. A computer-readable medium storing computer-executable instructions for causing a processor programmed thereby to perform a method comprising:
receiving a specification of a data set that comprises more than two groups of content, at least a first group of content having hierarchically organized content comprising a plurality of sub-groups of content;
determining a grid for display configuration;
determining first and second reading directions;
automatically determining a first layout position on the grid for at least a first group of content;
automatically placing the first group of content on the grid at the first layout position having a layout area;
automatically determining a second layout position on the grid for a first sub-group of content of the first group of content, the second layout position within the layout area;
automatically placing the first sub-group of content on the grid at the second layout position;
prior to placing a second sub-group of content of the first group of content on the grid, automatically determining a third layout position on the grid for the second sub-group of content, the third layout position located at a position in the first or second reading direction relative to the second layout position and within the area;
automatically placing the second sub-group of content on the grid at the third layout position;
prior to placing a second group of content of the two or more groups of content on the grid, determining a fourth layout position on the grid for the second group of content, the fourth layout position located at a position in the first reading direction relative to the first layout position;
automatically placing the second group of content on the grid at the fourth layout position; and
displaying the data set according to the first, second, third, and fourth layout positions.

13. The method of claim 1, wherein the grid comprises a plurality of columns and adjacent columns are separated by a gutter having a width, the method further comprising:
determining an integer number of columns to be used in displaying the first group of content, the integer number of columns being a plurality of columns; and
sizing a width of the first group of content to be displayed using the determined integer number of columns;
wherein displaying the data set comprises displaying the first group of content in the determined number of columns and the gutter between any adjacent columns.

14. The method of claim 13, wherein the determined number of columns comprises a plurality of columns and displaying the data set comprises display the first group of content in at least first and second columns of the plurality of columns and a gutter separating the at least first and second columns.

15. The method of claim 14, wherein the first group of content comprises at least first and second sub-groups of content, the first and second sub-groups of content being separated by the gutter between the first and second columns.

16. The method of claim 13, wherein the grid comprises a plurality of baseline rows, the method further comprising:
determining an integer number of baseline rows to be used in displaying the first group of content.

17. The method of claim 16, wherein the first reading direction is a horizontal reading direction and the determined, integral number of baseline rows has a height that is greater than a width of the gutter.

18. The method of claim 16, wherein the first reading direction is a vertical reading direction and the determined, integral number of baseline rows has a height that is smaller than a width of the gutter.

19. The method of claim 1, further comprising:
aligning the first and second groups of content relative to the first and second reading directions.

20. The method of claim 1, wherein the first group of content comprises at least first and second sub-groups of content and the first layout position comprises an area, the method further comprising:
with the computer system, automatically determining a fourth layout position for the first sub-group of content, the fourth layout position within the area;
with the computer system, automatically placing the first sub-group of content on the grid at the determined fourth layout position;

with the computer system, prior to placing the second sub-group group of content on the grid, automatically determining a fifth layout position for the second sub-group of content within the area, the fifth layout position located on the grid at a position in the first or second reading direction relative to the fourth layout position; and with the computer system, automatically placing the second sub-group of content on the grid at the determined fifth layout position.

\* \* \* \* \*